US006950317B2

(12) United States Patent
Lynch et al.

(10) Patent No.: US 6,950,317 B2
(45) Date of Patent: Sep. 27, 2005

(54) HIGH TEMPERATURE POWER SUPPLY

(75) Inventors: Thomas H. Lynch, Chatsworth, CA (US); Erich H. Soendker, Granada Hills, CA (US); Thomas A. Hertel, Santa Clarita, CA (US)

(73) Assignee: The Boeing Company, Chicago, IL (US)

( * ) Notice: Subject to any disclaimer, the term of this patent is extended or adjusted under 35 U.S.C. 154(b) by 58 days.

(21) Appl. No.: 10/755,926

(22) Filed: Jan. 13, 2004

(65) Prior Publication Data

US 2005/0152162 A1    Jul. 14, 2005

(51) Int. Cl.[7] ............................................. H02M 3/335
(52) U.S. Cl. ........................................ 363/16; 363/131
(58) Field of Search ........................... 363/16, 131, 97, 363/22, 23, 24, 25

(56) References Cited

U.S. PATENT DOCUMENTS 4,344,122 A * 8/1982 Jones ........................... 363/23
6,215,680 B1    4/2001 Rolston

OTHER PUBLICATIONS

Jim Williams; "Measurements on CCFL-Driver Ciucuits Pose"; EDN Access Website for Design, by Design; Design Feature: May, 1996; ppgs 1-6.
EDN Access Website for Design, by Design Department Newsletter, "Signals & Noise", Nov. 21, 1996; ppgs 1-3.
Ranbir Singh. James Richmond; "SIC Power Schottky Diodes in Power Factor Correction Circuits"; Cree, Inc. Application Note; CPWR-AN01 Rev; ppgs 1-9.
Jim Richmond; "Hard Switched Silicon IGBT's?, Cut Switching Losses in Half with Silicon Carbide Schottky Diodes"; Cree, Inc. Application Note; CPWR-AN03 Rev; ppgs 1-9.
Agarwal, Sing, Ryu, Richmond, Capell, Schwab, Moore, Palmour; "600 V, 1-40A, Schottky Diodes in SiC and Their Applications"; Cree, Inc., CPWR-AN02 Rev; ppgs 1-9.

* cited by examiner

Primary Examiner—Shawn Riley
(74) Attorney, Agent, or Firm—Vedder Price Kaufman & Kammholz

(57) ABSTRACT

A high-temperature, regulated power supply uses wide band gap transistors to drive a Royer circuit. Pulses output from the Royer circuit are gated through a pulse width modulator to control the duty cycle of wide band gap transistors that drive an output transformer. The output of the transformer is rectified and filtered to provide the regulated D.C. output voltage. Regulation is accomplished by sampling the output voltage, comparing it to a reference voltage and using the difference between the output voltage and the reference voltage to control the pulse width modulator. High temperature operability is provided by using wide band gap transistors and iron or steel core transformers. This technique also provides a radiation hard assembly.

32 Claims, 2 Drawing Sheets

HIGH TEMPERATURE POWER SUPPLY

FIELD OF THE INVENTION

This invention relates to power supplies. More particularly, this invention relates to a lightweight power supply, capable of operating in ambient temperatures as high as 300° C.

BACKGROUND OF THE INVENTION

Existing power supplies use well-known silicon semiconductors, which work well at temperatures up to approximately 125° C. but silicon semiconductors are ill suited for applications where ambient temperatures are above 125° C. At temperatures over approximately 125° C., charge carriers in silicon leak across P-N junction.

Even at temperatures below 125° C., silicon semiconductors that require high-power dissipation require a heat sink to dissipate heat in order to protect the devices from being damaged. Heat sinks take up space and add weight. Accordingly, there exists a need for a power converter also known as a regulated power supply that is usable in high temperature environments but which is also operable with minimally-sized heat sinks to minimize the volume of the power converter as well as its weight.

SUMMARY OF THE INVENTION

A high-temperature, regulated power supply is provided in part by a Royer inverter circuit driven by wide-band gap transistors. Square waves output from the Royer circuit drive a "magnetic amplifier," which operates as pulse width modulator. Output pulses from the pulse-width modulator drive wide-band gap transistors that drive current through an output transformer, the secondary of which is rectified and filtered.

Output voltage from the supply can be varied by adjusting the pulse width or duty cycle of pulses output from the pulse width modulator. The pulse width can be adjusted automatically using a feedback loop that drives the pulse width modulator to maintain an output voltage that is equivalent or proportional to a reference potential.

It is well known that heat transfer from a body to its surrounding environment by thermal radiation is proportional to $T^4$ where "T" is the body's temperature. Therefore, raising the temperature of the active devices in a power supply increases heat transfer significantly. Prior art silicon semiconductor devices leak current across their junctions at temperatures over 125° C., making them ill suited for applications where the ambient temperature is over approximately 125° C. By using "wide-band gap" semiconductors however, junction leakage current at high ambient temperatures is much less, making it possible to operate a semiconductor power supply in ambient temperatures over 300° C. using relatively small heat sinks.

The term "band gap" used herein refers to the energy difference between a material's non-conductive state and its conductive state. There is virtually no "band gap" in most metals, but a very large one in an insulator (dielectric). Technically, the "band gap" is the energy it takes to move electrons from the valence band to the conduction band. In most semiconductors, the "band gap" is relatively small. Silicon semiconductors have a band gap of approximately 1.12 eV. As used herein, a "wide band gap transistor" is a semiconductor made from materials that have an energy difference between the non-conductive state and conductive state that is greater than the band gap of silicon-based semiconductors. Silicon carbide is considered a "wide band gap" semiconductor. Its band gap is approximately 3 eV; it is also radiation hard. Crystalline silicone carbide can be doped to be either P-type or N-type semiconductor. A P-N junction made from silicon carbide transistor has a much higher "turn on" voltage than silicon (3 volts for silicon carbide vs. 0.7 volts for silicon) but will also have a much smaller leakage current at high temperatures because they have a much wider energy band gap. Although silicon carbide is a preferred semiconductor material, other wide band gap semiconductors that maintain functionality at temperatures above 125° C. and that are radiation hard are considered equivalent embodiments of a wide band gap semiconductor.

In addition to using wide band gap semiconductors, the transformers and coils used in the high temperature power supply are made using iron cores instead of composite materials. Iron and steel core transformers are operable at higher temperatures than are composite core transformers.

DETAILED DESCRIPTION OF PREFERRED EMBODIMENTS

Figure 1:
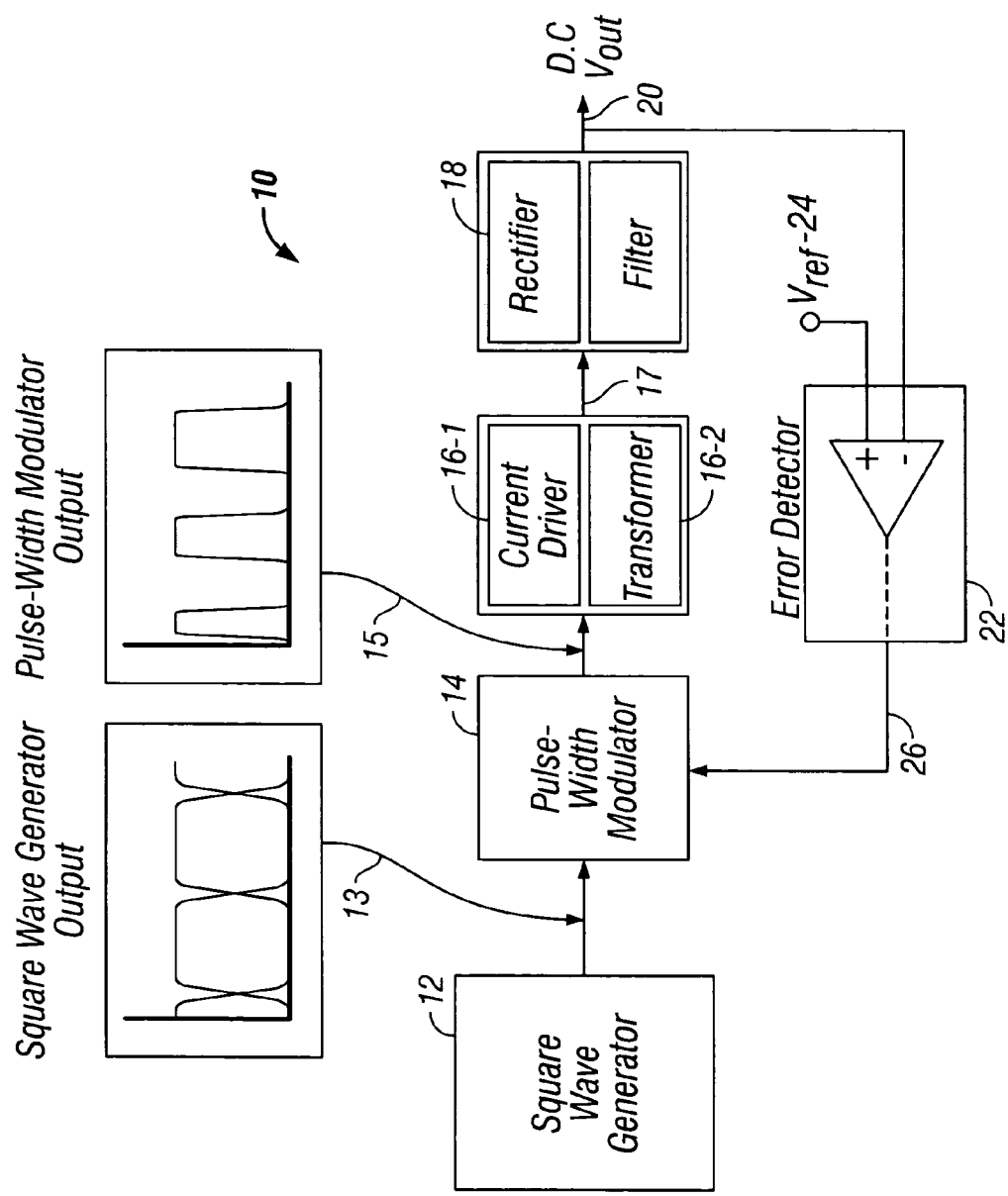
FIG. 1 illustrates an advantageous embodiment of a high temperature power supply.

FIG. 1 is a block diagram of functional elements of the high temperature power supply 10. The square wave generator 12, which is implemented by a Royer circuit and described more fully below, generates a square wave output pulse stream depicted by the waveform 13 shown in FIG. 1. The pulse width modulator 14 allows only a portion of each pulse from the Royer circuit to turn on a current driver 16-1, the output of which drives current through the primary winding of an output transformer 16-2. The output winding of the transformer 16-2 is rectified and filtered 18 to produce a D.C. output voltage 20.

The output of the pulse with modulator 14 is a stream of pulses, 15 that are output from the Royer circuit 12. Inasmuch as the pulses output from the pulse width modulator 14 will vary according to the load on the power supply and its desired output voltage, the pulse width modulator 14 output signal can be considered a "variable pulse width output" signal. The time duration of each pulse relative to the pulses duration from the Royer circuit is a function of a control signal 26 to the pulse width modulator from the error detector circuit 22 and will determine the power supply's D.C. output voltage.

A control signal 26 input to the pulse width modulator 14, increases and decreases the width (also known as time duration) of each pulse from the Royer circuit 12 in order to keep the voltage output 20 equivalent to a reference potential 24 that is input to the error detector 22. The error detector 22 compares the power supply D.C. output voltage 20 to a reference potential voltage 24 and generates an output signal 26 that controls the pulse width modulator 14.

As set forth above, the semiconductors are implemented using wide band gap, silicon carbide, which is well-known to be operable in ambient temperatures up to and above 300° C. and which is also known to be radiation hardened, i.e., relatively able to withstand intense, nuclear radiation.

Indeed, all semiconductors are wide band gap semiconductors making the power supply operable at temperatures as high as 300° C. In a preferred embodiment, the transformer cores used in the power supply are steel or iron and therefore operable at high temperatures.

Figure 2:
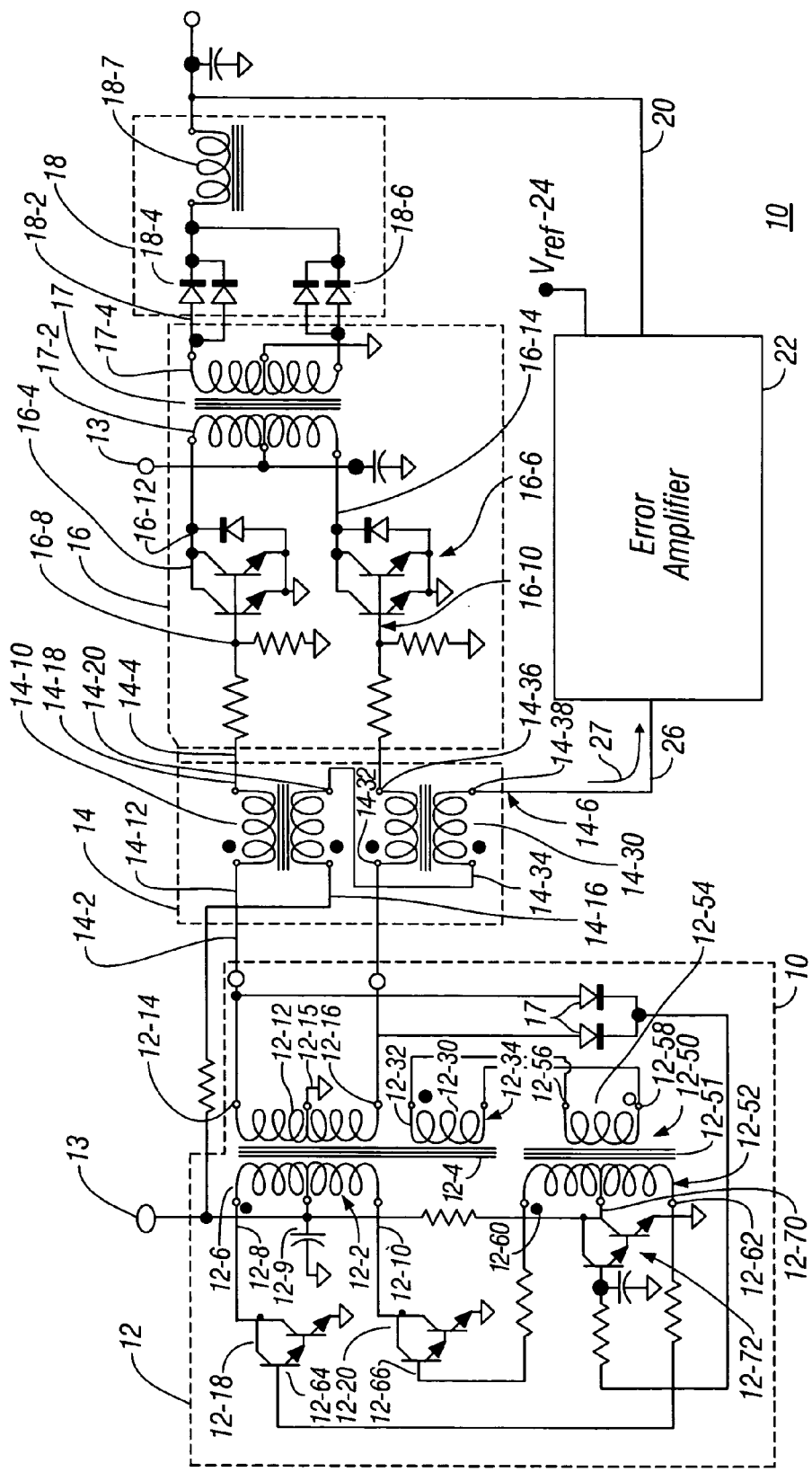
FIG. 2 is a schematic diagram of an advantageous embodiment of preferred embodiment of a high temperature power supply.

FIG. 2 is a schematic diagram of a preferred embodiment of a high-temperature regulated power supply 10.

As set forth above, the square wave generator 12 is a Royer circuit comprised of an iron-core transformer 12-2, which in the preferred embodiment is a non-saturating core 12-4 having at least three windings. One of the windings on the non-saturating core 12-4 is a first primary winding 12-2 that has two input terminals identified by reference numerals 12-6 and 12-8. This primary winding also has a center tap terminal identified by reference numeral 12-9.

This first transformer 12-2 has two secondary windings that are identified by reference numerals 12-12 and 12-30. The first secondary winding 12-12 has a center tap, which is identified by reference numeral 12-15. This first secondary winding 12-12, also has first and second output terminals, 12-14 and 12-16, respectively, which are directly coupled to first and second magnetic amplifiers 14-10 and 14-30, the operation of which is explained below.

The non-saturating core transformer 12-2 has a second, secondary winding identified by reference numeral 12-30. The second, secondary winding 12-30 terminals are identified by reference numerals 12-32 and 12-34 and are directly connected to the terminals 12-56 and 12-58 respectively of the primary winding 12-54 of a second transformer that is a "saturating core transformer" identified in FIG. 2 by reference numeral 12-50.

For purposes of claim construction, a "saturating" core is considered a transformer core that becomes fully saturated with magnetic flux. When a transformer's core is fully saturated, the transformer cannot inductively couple voltage signals between its primary windings and secondary windings. When a transformer's core is saturated, the windings also lose their inductive character. A saturation current provided by one winding can therefore act to control or gate voltage through the other winding as a pulse width modulator.

The second transformer 12-50 has a center tapped secondary winding 12-52, the outputs of which are identified by reference numerals 12-60 and 12-62 and are coupled through resistances to the bases 12-64 and 12-66 of two Darlington-pair transistors 12-18 and 12-20. As is known in the art, Darlington pair transistors have a higher input impedance than does a single transistor. They also have a much higher current gain than does a single transistor. The center tap of the transformer is coupled to a power source so as to provide a bias current for the Royer's Darlington-pair drive transistors. Relatively small input signals on a bases 12-64 and 12-66 will cause the corresponding transistor to turn "on" thereby pulling current through the primary winding of the first transformer 12-2.

The operation of a Royer circuit 12 is well known. Implementing a Royer circuit using iron or steel core transformers and driving the Royer circuit with wide band gap transistors is heretofore new however because wide band gap semiconductors require higher operating voltages. The behavior of a Royer circuit is known but briefly described here nonetheless for purposes of clarity hereafter.

When a voltage is applied to power supply input terminal 13, a voltage is applied to the center tap 12-70 of the second, saturating transformer 12-50 causing a voltage to appear at both output terminals 12-60 and 12-62 of the same winding 12-52. Because each of these terminals 12-60 and 12-62 is directly coupled to a corresponding base 12-64 and 12-66 of one of the two, wide band gap transistors 12-18 and 12-20. Although the bases of both transistors are driven high at ostensibly the same time, only one of the transistors 12-18 and 12-20 will turn "on" because of component differences between the base drive circuits of the two transistors 12-18 and 12-20. Therefore, upon the application of a voltage at the supply terminal 13, only one of the two Royer circuit drive transistors 12-18 and 12-20 will turn on before the other.

Regardless of which transistor turns on first, the one that does turn on and draws current through the primary winding 12-6 and will thereby induce a voltage on the first secondary winding 12-12 of the first transformer 12-2. A voltage will also be induced on the second secondary 12-30. As the connections to the windings are shown in FIG. 2, a voltage is induced on the second secondary winding 12-30 by the current flowing through the primary 12-6. The voltage induced on the secondary winding 12-30 is coupled to the primary winding 12- 54 of the second transformer 12-50, this induces a voltage on the secondary of 12-50 and forces one of the two Royer circuit drive transistor devices 12-18 and 12-20 on. Transformer 12-50 will maintain the drive to one of the base circuits until the core of 12-50 saturates. Once the core of the transformer 12-50 saturates, the phase of the output voltage from the transformer 12-50 will flip and turn off the previously "on" transistor and turn on the other transistor. As the input voltage 13 increases the transformer 12-2 has outputs 12-14 and 12-16 that are connected to rectifiers 17 which are connected as a control voltage to transistor 12-72. Transistor 12-72 disables the startup voltage by clamping the center tap terminal 12-70 to ground.

As is well-known, the output 13 of the Royer circuit 12 is a square wave or pulse train of relatively fixed-with pulses, the frequency of which is determined by the saturation constant or volt-seconds required to saturate the core 12-51 of the second transformer 12-50. Pulse trains of 10 kilohertz to 100 kilohertz or even 1 megahertz are readily possible using the Royer circuit. By using wide band gap transistors for the transistors 12-18, 12-20 and 12-72, and by using saturating core transformers, the Royer circuit can be made to operate at temperatures as high as 300° C.

Inasmuch as a desired objective of the invention is to provide regulated output power at high temperatures, the preferred embodiment of the invention uses silicon carbide transistors which although they require higher power supply voltages, they have low leakage currents at elevated temperatures (as compared to silicon devices). Such transistors can be implemented as bipolar junction transistors or field-effect transistors. As set forth above, wide band gap materials other than silicon carbide can also be used so long as such materials exhibit low current leakage at high-temperatures as does silicon carbide. Although FIG. 2 shows Darlington pairs driving the Royer circuit, single transistors could used as well.

As shown in FIG. 1, the output 13 of the Royer circuit is coupled into a pulse with modulator 14. Pulse width modulators can be implemented in many ways, including semiconductor devices. As shown in FIG. 2 and in order to provide a pulse width modulator that will operate at high temperatures, in a preferred embodiment the pulse width modulator 14 is implemented using two so-called magnetic amplifiers 14-10 and 14-30, also referred to herein as "MAG AMPS." As can be seen in FIG. 2, these magnetic amplifiers 14-10 and 14-30 are implemented using saturating core transformers.

With respect to the first one of these two magnetic amplifiers 14-10, it is comprised of two windings on a saturating core made up of either iron or steel, i.e., preferably not of any composite material. The "primary" winding has a first input terminal 14-16 coupled to the power supply potential 13. The other end of this winding is identified by reference numeral 14-20 and is coupled to the first input terminal of the "primary" of the second magnetic amplifier 14-30. The first terminal 14-16 of the primary of the first MAG AMP 14-10 is considered a "control current input terminal" of the primary winding of the first magnetic amplifier 14-10. The second terminal 14-20 of the primary is considered a "control current output terminal."

As shown in FIG. 2, the first MAG AMP 14-10 also has a secondary winding, one terminal of which is considered a first input voltage terminal. This first input voltage terminal is identified by reference numeral 14-12. The other terminal of the secondary winding is considered an output voltage terminal. This output voltage terminal is identified by reference numeral 14-18.

The second magnetic amplifier 14-30 is also comprised of two windings on a saturating core that is also made up of either iron or steel. The "primary" winding of the second MAG AMP 14-30 has a first control current input terminal identified by reference numeral 14-34. This saturation input terminal for the second MAG AMP is coupled to the "bottom" terminal 14-20 of the primary of the first MAG AMP 14-10 so that control current flowing through the first MAG AMP 14-10 primary winding must also flow through the second MAG AMP 14-30 primary winding.

The "bottom" terminal of the primary winding of the second MAG AMP is identified by reference numeral 14-38 and considered the "control current output terminal" for the second MAG AMP. This control current output terminal 14-38 is coupled to the output of the error amplifier 22, which is described more fully below. Current flowing out into the error amplifier 22 flows through the primary windings of both MAG AMPS 14-10 and 14-30 insuring that both cores of these MAG AMPS are equally controlled to the desired volt-second value.

As shown in FIG. 2, the second MAG AMP 14-30 also has a secondary winding, one terminal of which is considered a first input voltage terminal for the second MAG AMP and identified by reference numeral 14-32. The other terminal of the secondary winding is considered an output voltage terminal for the second MAG AMP 14-30. This output voltage terminal is identified by reference numeral 14-36.

The MAG AMPs are effective as pulse width modulators by controlling the saturation of the transformer cores. As the control current 27 increases, thereby increasing the current through the primary windings and thereby increasing the flux through the core, a voltage pulse input to either of the cores at its first input voltage terminal will propagate through the secondary, if the core is fully saturated with flux induced by current flowing through the MAG AMPS other windings. The width of the pulse appearing on the output voltage terminals 14-18 and 14-36 of the two MAG AMPS will therefore be function of the current 27 through the MAG AMPs and the signal input to the input voltage terminals. By increasing and decreasing the control current 27, the portion or duration of output pulses with respect to input pulses can be increased and decreased.

The pulses output from the pulse width modulator 14 are coupled to the bases 16-8 and 16-10 of current driver transistors 16-4 and 16-6 respectively. Like the other transistors of the circuit shown in FIG. 2, the driver transistors are preferably embodied as wide band gap transistors, which are capable of operating at much higher temperatures but which require higher operating voltages. As shown in FIG. 2, the current driver transistors 16-4 and 16-6 are actually paired transistors to increase the current drawn through the primary 17-2 of output transformer 17. Alternate embodiments of the invention would include using single driver transistors. A center tap on the transformer primary 17-2 allows the current driver transistors 16-4 and 16-6 to induce a "bi-polar" voltage across the primary winding 17-2, which yields a truly bi-polar output voltage across the secondary winding 17-4.

Clamping diodes across the collectors and emitters of the driver transistors 16-4 and 16-6 become forward biased and allow current to flow through the primary winding as the field in the primary collapses thereby protecting the driver transistors 16-4 and 16-6 from damage. For example, the clamping diode across the collector and emitter of the first driver transistors 16-4 protects the driver transistors 16-4 when the second driver transistors 16-6 turn off.

A.C voltage induced at the secondary 17-4 winding of the output transformer 17 is full-wave rectified by wide band gap diodes 18-4 and 18-6. In the preferred embodiment, these diodes 18-4 and 18-6 are paired to provide a higher current carrying capability in the power supply's output. Alternate embodiments would include using single diodes. The preferred embodiment contemplates a full-wave rectifier at the secondary of the output transformer, which could also be embodied as a bridge rectifier circuit. Alternate embodiments would also include using a half-wave rectifier at the output of the driver transformer.

A choke 18-7 at the output of the full-wave rectifier diodes 18-4 and 18-6 smoothes A.C. ripple from the full-wave rectifiers' output providing a true D.C. output voltage 20. This output voltage 20 is provided as an input to the error amplifier 22 (also referred to as a "difference amp"), which compares the output voltage 20 to a reference voltage 24 and provides an output current 26. The output current 26 of the error amplifier 22 provides the control current through the aforementioned MAG AMPS 14-10 and 14-30. Inasmuch as the error amplifier 22 provides an output current in response to an input voltage differential, the error amplifier 22 can be considered a voltage-to-current converter or, an adjustable current sink inasmuch as it sinks current through the MAG AMPS 14-10 and 14-30 that is sourced by the power source 13.

While the present invention has been described in connection with the illustrated embodiments, it will be appreciated and understood that modifications can be made without departing from the true spirit and scope of the invention and that the scope of the invention should be determined by the following claims. For instance, those of skill in the art will recognize that the wide band gap transistors could be implemented with materials other than silicon carbide. Moreover, the transistors could be implemented bi-polar junction transistors or field-effect transistors. Single transistors could be used throughout the Royer circuit shown in FIG. 2, instead of using Darlington pairs as shown. Single driver transistors however having lower current gain and would require higher current drive than the Darlington pairs.

The Royer circuit might also be implemented with single driver transistor, on the primary of the first transformer 12-2. The Royer circuit might also be implemented with only a single, saturating core transformer, i.e., without the second transformer 12-50, which acts as to control the Royer circuit's oscillation.

The MAG AMPs are operable in very high temperature environments because they are not implemented using any active semiconductor devices. Depending on the particular application, the pulse-width modulator 14 could be implemented using well-known semiconductor circuits. If the pulse-width modulator 14 can be located out of the hostile environment, only the Royer circuit, and the driver transistors might need to be operable in high temperature environments.

The error amplifier 22 can be readily implemented using operational amplifiers and current drivers and is preferably operated outside of a hostile environment. Instead of using a "op amp" an alternate and equivalent embodiment would include using much more complex analog-to-digital converters, a processor to digitally computer input voltage differences and calculate a correction current produced by a digital-to-analog converter and high-power driver transistors.

Because the high-temperature power supply does not require the relatively massive heat sinks used to cool silicon devices, the claimed invention finds application in many hostile environments such as space vehicles, where radiation hardening and light weight is important. The high temperature power supply can also be used to control electric motors in high-temperature environments, such as in electrically powered automobiles. The high-temperature power supply is also useful in arcane applications, such as providing power to drilling equipment, such as drill point electronics and controllers.

What is claimed is:

1. A Royer circuit comprised of:
   a first transformer having a saturating core about which is wound at least two windings that include: a primary winding with first and second inputs and a secondary winding having first and second outputs;
   a first wide band gap transistor coupled to said first input; and
   a second wide band gap transistor coupled to said second input;
   said first and second wide band gap transistors alternately delivering current to the inputs of the primary winding from a power source thereby generating a substantially square-wave output voltage across the secondary winding outputs.

2. The Royer circuit of claim 1 wherein at least one of said first and second wide band gap transistors are formed from silicon carbide.

3. The Royer circuit of claim 1 wherein at least one of said first and second wide band gap transistors are bipolar junction transistors.

4. The Royer circuit of claim 1 wherein at least one of said first and second wide band gap transistors is a Darlington pair.

5. The Royer circuit of claim 1 wherein at least one of said first and second wide band gap transistors is a field effect transistor.

6. The Royer circuit of claim 1 wherein said first and second wide band gap transistors are radiation hard.

7. The Royer circuit of claim 1 wherein said first and second wide band gap transistors are capable of operating in ambient temperatures over 300° C.

8. A Royer circuit comprised of:
   a first transformer having a non-saturating core about which is wound at least three windings that include:
   a first primary winding having first and second input terminals,
   a first secondary winding having first and second output terminals; and
   a second, secondary winding also having first and second output terminals;
   a first wide band gap transistor coupled to said first input terminal of said first primary winding;
   a second wide band gap transistor coupled to said second input terminal of said first primary winding;
   a second transformer having a saturating core, about which is wound a primary winding with at least first and second inputs coupled to the first and second output terminals of the second, secondary winding, said second transformer having a secondary winding, the outputs of which are coupled to corresponding inputs of said first and second wide band gap transistors; and
   wherein the inputs of said first and second wide band gap transistors receive signals from the second transformer whereby they alternately deliver current to the inputs of the primary winding of the first transformer from a power source thereby generating a substantially square-wave output voltage across the first secondary winding outputs of the first transformer.

9. The Royer circuit of claim 8 wherein said second transformer includes a center tap, to which a third, wide band gap transistor is coupled, said third wide band gap transistor providing start up current to first and second wide band gap devices.

10. The Royer circuit of claim 8 wherein at least one of said first and second wide band gap transistors are formed from silicon carbide semiconductor material.

11. The Royer circuit of claim 8 wherein at least one of said first and second wide band gap transistors are bipolar junction transistors.

12. The Royer circuit of claim 8 wherein at least one of said first and second wide band gap transistors is a Darlington pair.

13. The Royer circuit of claim 8 wherein at least one of said first and second wide band gap transistors is a field effect transistor.

14. The Royer circuit of claim 8 wherein said first and second wide band gap transistors are radiation hard.

15. The Royer circuit of claim 8 wherein said first and second wide band gap transistors are capable of operating in ambient temperatures over 300° C.

16. A high-temperature regulated power supply having an output terminal, said power supply comprised of:
   a Royer inverter circuit having at least a first transformer having at least a primary winding with first and second inputs and a secondary winding having first and second outputs, the Royer inverter circuit including a first wide band gap transistor coupled to said first input of said primary winding and a second wide band gap transistor coupled to said second input of said primary winding;
   a pulse-width modulator (PWM) having an voltage supply input and a variable pulse width output and a control input, the voltage supply input of said PWM being coupled to at least one of said first and second outputs of said secondary winding, the variable pulse width output of the PWM being a pulse train having a duty cycle determined by a signal input to said control input of said PWM from the output terminal of said power supply and a signal from at least one of the first and second outputs of the secondary winding;
   a third wide band gap driver transistor having an input and an output, the input of said wide band gap driver transistor being coupled to the variable pulse width output of said PWM;
   an output transformer having a primary winding and a secondary winding, the primary winding being coupled to the output of said wide band gap driver transistor, the secondary winding being coupled to the input of a an output rectifier, an output of said output rectifier being coupled to a filter and to the control input of said PWM, said third wide band gap driver transistor controlling the flow of current through control winding of MAG AMP transformers to produce an output voltage that is regulated by signals input to the control input of said PWM.

17. The high-temperature power supply of claim 16 wherein said pulse-width modulator is comprised of at least one magnetic amplifier coupled to at least one of the outputs of the secondary winding of said Royer circuit.

18. The high-temperature power supply of claim 16 wherein said pulse-width modulator is comprised of a first magnetic amplifier coupled to the first output of the secondary winding of said Royer circuit and a second magnetic amplifier coupled to the second output of the secondary winding of the Royer circuit.

19. The high-temperature power supply of claim 16 wherein said rectifier is a full-wave rectifier comprised of wide band gap semiconductors.

20. The high-temperature power supply of claim 16 wherein said rectifier is a bridge rectifier comprised of wide band gap semiconductors.

21. The high-temperature power supply of claim 16 wherein said first and second magnetic amplifiers are first and second transformers, the primary windings of which are connecter in series between a reference potential for said high-temperature power supply and an adjustable current sink.

22. The high-temperature power supply of claim 21 wherein said adjustable current sink is a voltage-to-current converter having a control input coupled to the output terminal of the power supply.

23. The high-temperature power supply of claim 16 wherein at least one of said first, second and third wide band gap transistors are formed from silicon carbide semiconductor material.

24. The high-temperature power supply of claim 16 wherein at least one of said first, second and third wide band gap transistors are bipolar junction transistors.

25. The high-temperature power supply of claim 16 wherein at least one of said first, second and third wide band gap transistors is a Darlington pair.

26. The high-temperature power supply of claim 16 wherein at least one of said first, second and third wide band gap transistors is a MOSFET.

27. The high-temperature power supply of claim 16 wherein (5 total?) said first and second wide band gap transistors are radiation hardened.

28. The high-temperature power supply of claim 9 wherein said first, second and third (forth, fifth) wide band gap transistors are capable of operating in ambient temperatures over 300° C.

29. A high-temperature power supply comprised of:
a first signal generator having an output whereat a substantially square wave signals is presented;
a first magnetic amplifier (MAG AMP) having a first input terminal coupled to the output of said first signal generator, said first MAG AMP also having a control current input terminal coupled to a current sink, a control current output terminal and further having an output voltage terminal at which is generated a voltage pulse, the time duration of which is determined by a signal at said first input terminal and current flowing through said control current input terminal and said control current output terminal;

a second magnetic amplifier (MAG AMP) having a first input terminal coupled to the output of said first signal generator, said MAG AMP also having a control current input terminal coupled to the control current output terminal of said first MAG AMP and further having a control current output terminal, and further having an output voltage terminal at which is generated a voltage pulse, the time duration of which is determined by a signal at said input terminal and a current flowing through said control current input and control current output;

an error voltage detector having a reference voltage input and a control voltage input and further having an output coupled to the control current output of said second magnetic amplifier and through which current flows according to the voltage difference between said reference input and said control input;

at least a first wide band gap driver transistor having an input coupled to the output voltage terminal of said first magnetic amplifier, and having an output coupled to a first input terminal of the primary winding of an output transformer having a primary winding and a secondary winding;

a second wide band gap driver transistor having an input coupled to the output voltage terminal of said second magnetic amplifier, and having an output coupled to a second input terminal of the primary of the output transformer, a rectifier, having an input coupled to an output of the secondary winding of said output transformer, said rectifier further having an output;

a choke having an input coupled to the output of said rectifier, said choke also having an output at which a regulated D.C. voltage is available and which is coupled to the control input of said error voltage detector.

30. The high-temperature power supply of claim 29 wherein said rectifier is a full-wave rectifier comprised of wide band gap semiconductors.

31. The high-temperature power supply of claim 29 wherein said first and second magnetic amplifiers are first and second transformers, the primary windings of which are connecter in series to each other, and the series connected windings are across a reference potential for said high-temperature power supply and an adjustable current sink.

32. The high-temperature power supply of claim 29 wherein said error voltage detector is a voltage-to-current converter having a control input coupled to the output of the output rectifier and having a reference potential input.

* * * * *